United States Patent [19]

Mizuno

[11] 4,135,682

[45] Jan. 23, 1979

[54] EMERGENCY LOCKING RETRACTOR FOR AUTOMOBILES

[75] Inventor: Yoshio Mizuno, Nagoya, Japan

[73] Assignee: Kabushiki Kaisha Tokai Rika Denki Seisakusho, Japan

[21] Appl. No.: 739,645

[22] Filed: Nov. 8, 1976

[30] Foreign Application Priority Data

Nov. 13, 1975 [JP] Japan .......................... 50-154826[U]

[51] Int. Cl.² ..................... A62B 35/02; B65H 75/48
[52] U.S. Cl. ............................................ 242/107.4 B
[58] Field of Search ................ 242/107.4 B; 297/388; 280/744–747

[56] References Cited

U.S. PATENT DOCUMENTS

| | | | |
|---|---|---|---|
| 2,953,315 | 9/1960 | Lautier et al. | 242/107.4 B |
| 3,450,368 | 6/1969 | Glauser et al. | 242/107.4 B |
| 3,593,942 | 7/1971 | Rex | 242/107.4 B X |
| 3,711,037 | 1/1973 | Jakob | 242/107.4 B |
| 3,897,024 | 7/1975 | Takada | 242/107.4 B |
| 3,979,083 | 9/1976 | Fohl | 242/107.4 B |

*Primary Examiner*—Harvey C. Hornsby
*Assistant Examiner*—John M. Jillions
*Attorney, Agent, or Firm*—Koda and Androlia

[57] ABSTRACT

An emergency locking device for seatbelts may be fabricated by causing the engagement of a pawl with a ratchet wherein the ratchet is coupled to a shaft upon which the seatbelt is coiled. When the motion of the ratchet is stopped by the pawl, the seatbelt cannot be extended by any amount of force. The pawl may be loosely rotatably and translationly coupled to the shaft. In addition, the pawl may be supported and guided by an inertial member such that when an impulsive force is applied to the shaft, the inertial member is displaced with respect to the pawl such that the pawl is rotated and translated relative to the guiding portions of the inertial member such that the pawl engages and locks the ratchet. The pawl may be restored to its initial condition by removal of the force and reinitialization of position with respect to the inertial member and shaft by appropriate spring mechanisms.

6 Claims, 5 Drawing Figures

EMERGENCY LOCKING RETRACTOR FOR AUTOMOBILES

BACKGROUND OF THE INVENTION

1. Field of the Invention

The present invention relates to emergency locking devices for seatbelts and in particular, relates to locking seatbelt retractors incorporating inertial devices to cause a pawl to lock against a ratchet.

2. Description of the Prior Art

The prior art locking, inertial seatbelt retractors have been typically characterized by complex design. The complexity by which the inertial member coacted with a pawl and ratchet to lock the seatbelt retractor upon application of an impulsive force has caused such prior art devices to be expensive, difficult to assemble quickly, unreliable and slow acting. Therefore, what is needed is a rugged, simple locking retractor mechanism for a seatbelt which can be easily assembled by mass production methods, which is highly reliable, and which is capable of responding to an impulsive force within a very short time.

BRIEF SUMMARY OF THE INVENTION

The present invention is a seatbelt retractor mechanism which is comprised of a frame member, a shaft means, a ratchet and pawl means and an inertial member. The shaft means is coupled to a seatbelt and is rotatably coupled to the frame member. The shaft means is for coupling the seatbelt to the retractor mechanism. The ratchet and pawl means is for arresting the motion of the shaft means relative to the frame member. The ratchet and pawl means is coupled to the frame member and includes a rotatable and translational pawl member which is also coupled to the shaft means. The rachet and pawl means also includes a ratchet member. The inertial member is rotatably coupled to the shaft means and slideably engages the pawl member. Displacement of the inertial member with respect to the pawl member causes the pawl member to engage the ratchet member and thus to arrest the motion of the shaft means relative to the frame member upon application of an impulsive force to the shaft means.

Further details of the present invention and its various embodiments may be better understood by reviewing the detailed description of the preferred embodiment in connection with the accompanying figures.

DETAILED DESCRIPTION OF THE PREFERRED EMBODIMENTS

The essential features of the present invention are: (1) that a pawl is able to move in a radial direction thereby causing its tip to engage one of the engaging teeth of a ratchet and that a supporting guide is in slideable contact with this pawl, which guide is part of an inertial plate which is rotatably displaceable with respect to the shaft upon which the seatbelt is wound; and (2) that such a pawl is coupled to an eccentric portion of a rotor plate coupled to the shaft. The present invention is an emergency locking device which is simply constructed and in which the differential rotation of the rotor plate with respect to the inertial plate is directly converted into pivotal and radial motion of the pawl thereby locking the device. The present invention constitutes an improved device for use in vehicles equipped with seatbelt retractor mechanisms. Such a mechanism typically includes a frame, a seatbelt retractor shaft rotatably coupled to the frame and supplied with a source of rotational power used to retract the belt. A ratchet ring may be mounted outside one of the side walls of the frame so that it surrounds a projecting portion of the retractor shaft. An inertial plate may be rotatably mounted on the retractor shaft so as to be free to slip thereon. A rotor plate is rigidly coupled to the retractor shaft. The ratchet ring has a large number of engaging teeth formed along its inside surface oriented in such a fashion that engagement with a pawl will prevent further extension of the belt from the retractor shaft. The rotor plate and inertial plate are coupled together by a spring which is extended during abrupt rotation of the retractor shaft in response to an impulsive rotational force applied to the shaft. When the body of the passenger using the seatbelt moves forward due to an abrupt change in the speed of the vehicle, the belt is abruptly extended, and the differential motion generated between the inertial plate and rotor plate causes a pawl to be radially displaced and to engage the ratchet teeth of the ratchet ring. The present invention may be better understood by a detailed reference to FIGS. 1–5.

Figure 1:
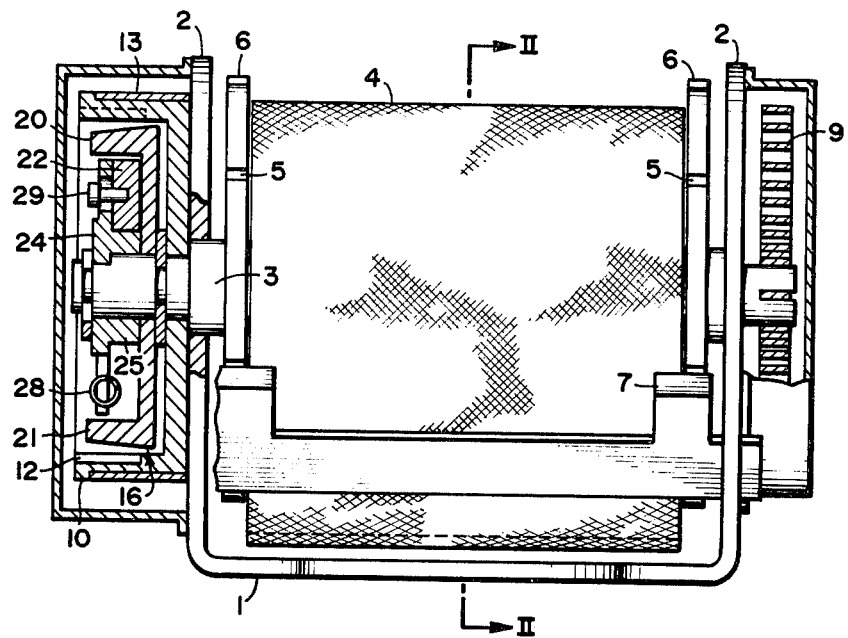
FIG. 1 is an end view of the retractor mechanism showing in cross section many of the elements of the ratchet and pawl means.
Figure 2:
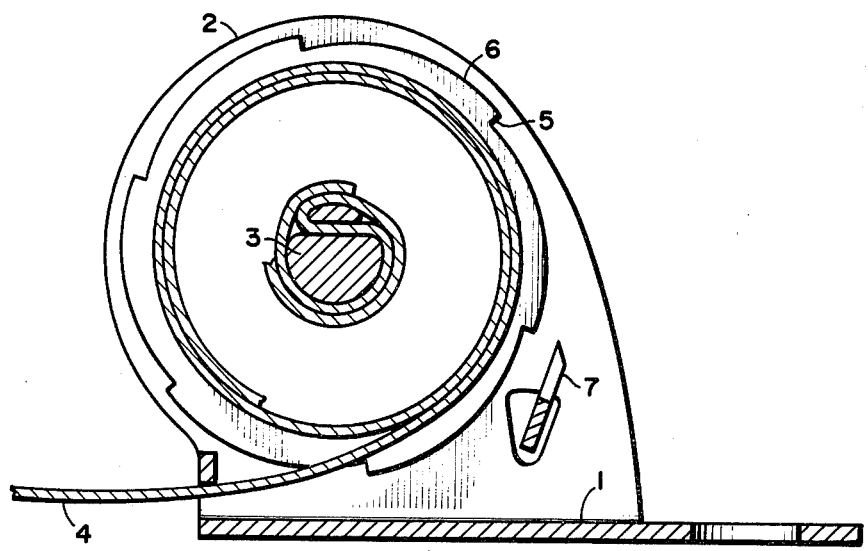
FIG. 2 is a side view taken through section II-II of FIG. 1 showing the attachment of the seatbelt to the shaft means.
Figure 3:
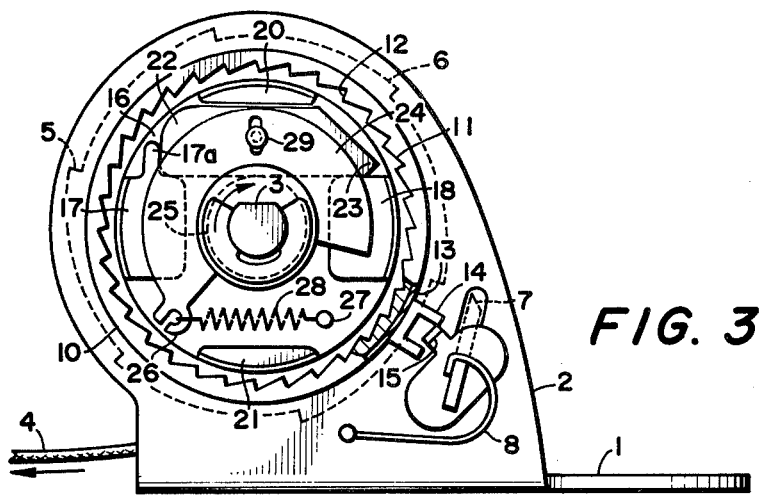
FIG. 3 is a cross sectional side view taken through the left end of the retractor mechanism as shown in FIG. 1 and showing in plan view many of the elements of the ratchet and pawl means. The view of FIG. 3 is the configuration of the present invention in the unlocked state.
Figure 4:
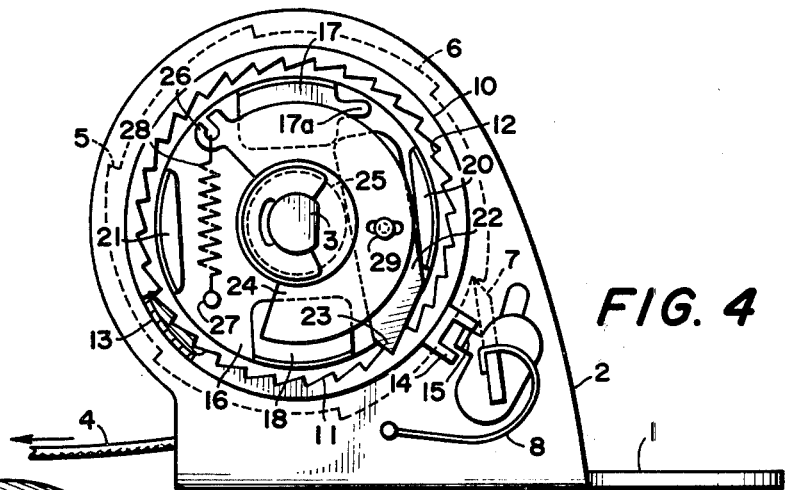
FIG. 4 is a cross-sectional view identical to FIG. 3 except that the present invention is shown in the locked state.

FIG. 1 illustrates a front view of frame member 1 which is also shown in side view in FIGS. 2–4. A retractor shaft 3 best shown in FIG. 2 is coupled to one end of seatbelt 4 by conventional means. Seatbelt 4 is coiled about retractor shaft 3 to form a reeled roll. Retractor shaft 3, as shown in FIG. 1, is rotatably coupled between opposing frame walls 2 on both sides of frame member 1. End discs 6 disposed at each end of retractor shaft 3 help to form the coiled reel of seatbelt 4 and are mounted between opposing walls 2. The peripheral edge of discs 6 are formed into a plurality of ratchet teeth 5 whose faces are arranged and configured such that engagement by a suitable pawl will prevent the further extension of seatbelt 4 from its coil. Thus, discs 6 become locking plates when engaged with an opposing pawl such as pawl 7. In the embodiment illustrated, pawl 7 as shown in frontal view in FIG. 1 is pivoted with respect to frame member 1 so as to selectively engage and disengage ratchet teeth 5 of discs 6. FIGS. 3 and 4 show one way in which pawl 7 may be attached to a leaf spring 8 which in turn is rigidly attached at one end to frame member 1 and at the other end to pawl 7. In the illustrated embodiment, spring 8 keeps pawl 7 from engaging discs 6 during the quiescent state when no impulsive force is applied to seatbelt 4. It is to be understood, of course, that many other means may be used by which pawl 7 might be suitably coupled to frame member 1. The means shown is to be understood as taken for the purposes of illustration only.

Coil spring 9 as shown in FIG. 1 supplies retractor shaft 3 with a rotational force which tends to withdrawn seatbelt 4 back onto the reel formed about retractor shaft 3. Coil spring 9 may be attached to retractor shaft 3 by any means well known to the art including a simple slot attached as illustrated in FIG. 1.

On the opposing frame wall 2, a ratchet ring 10 shown in cross-section in FIG. 1 and shown in partial outline in FIGS. 3 and 4 is rotatably disposed about retractor shaft 3. Inertial plate 16 is similarly rotatably coupled to retractor shaft 3 and is disposed within the perimeter of ratchet ring 10 as best shown in FIG. 1. A rotor plate 24 is rigidly coupled to shaft 3 and is similarly disposed within the inside perimeter of ratchet ring 10. Greater detail of inertial plate 16, and rotor plate 24 may be seen in the perspective view of FIG. 5. It is to be understood that various modifications and alterations might be made in various details and aspects to the present invention without departing from the scope or spirit. For example, retainer ring 10 might be rigidly coupled to frame member 1 and pawl 7 and ratchet discs 6 might be eliminated. However, in the presently illustrated embodiment, shown for the purposes of illustration, pawl 7 is retained and ratchet ring 10 is disposed upon retractor shaft 3 so that it is free to rotate. The inside periphery of ratchet ring 10 is provided with a large number of sawtooth ratchet teeth 11 whose engaging faces 12 are arranged and configured in such a manner that engagement with an appropriate pawl in a locked position will prevent the further extension of seatbelt 4 from its coil as described below.

A thin slip ring 13, such as made from a leaf spring, is mounted along the outside periphery of ratchet ring 10. A female link 14 is rigidly coupled to slip ring 13 and engages male link 15. Male link 15 is in turn coupled to pawl 7 such that rotation of ratchet ring 10 is restricted by the tension of spring 8.

Figure 5:
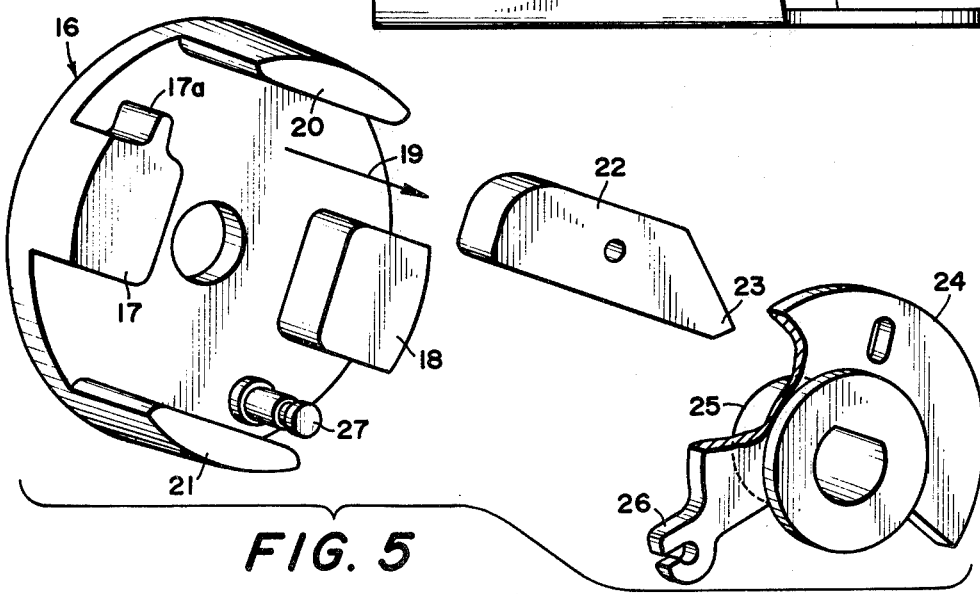
FIG. 5 is an expanded and simplified view of the principal parts of the inertial member, ratchet and pawl means and shaft means which are employed to impart the rotational and translational displacement of the pawl member according to the present invention.

As shown in FIG. 5, inertial plate 6 is in the general form of a disc. Two projecting portions 17 and 18 are formed on the outside surface of inertial plate 16 on diametrically opposite points with respect to the center of inertial plate 16. Rotational symmetry and balance of inertial plate 16 is further maintained by a provision of projections 20 and 21 near the perimeter of inertial plate 16 above and below the mating hole provided for retractor shaft 3. A stopper projection 17A is formed as part of projection 17. Projection 17, 18 and 20 collectively combine to form a supporting guide 19. A pawl 22 is slideably disposed within guide 19 such that it is free to move relative to inertial plate 16 along a radially oriented direction. An engaging face 23 is formed at the tip of pawl 22 and engages any one of teeth 11 of ratchet ring 10. Rotor plate 24 is arranged and configured such that it rotates outside projections 17 and 18 of inertial plate 16 as shown in FIG. 1. A keyed boss 25 makes sliding contact with pawl 22 as shown in FIGS. 3 and 4 and is rigidly coupled to rotor plate 24. One end of boss 25 is cut out to form a fan shaped key which may mate with a similarly shaped retractor shaft 3. An arm 26 projects radially from rotor plate 24. A spring 28 as shown in FIGS. 3 and 4 is coupled between arm 26 and a spring attachment pin 27 fixed to inertial plate 16. Spring 28 is extended during an abrupt rotation of retractor shaft 3 and of rotor plate 24 due to the relative displacement between inertial plate 16 and rotor plate 24. An eccentric pin 29, shown in FIGS. 3 and 4, is coupled to an eccentric portion of rotor plate 24 and pawl 22 at a point near the center of gravity of the pawl. Therefore, pawl 22 is arranged and configured to ride somewhat loosely or in a nearly balanced state upon pin 29. It should be noted that a slot is provided in rotor plate 24 such that pin 29 may have a limited degree of radial travel with respect to the center of rotor plate 24. The operation of the present invention may now be understood in connection with the following description.

When seatbelt 4 is extended at a normal rate in the direction indicated by the arrow in FIG. 3, retractor shaft 3 and rotor plate 24 rotate. Inertial plate 16 is similarly pulled by spring 28 without any substantial extension of spring 28 such that inertial plate 16 follows the rotation of retractor shaft 3. Clearly, the degree of coupling in this mode between inertial plate 16 and retractor shaft 3 is determined in part by the spring constant of spring 28, which may be chosen according to design principles well known to the art. Accordingly, pawl 22 remains stationary in the initial position as shown in FIG. 3.

However, if seatbelt 4 is abruptly extended, an impulsive rotational force is imparted to retractor shaft 3 and rotor 24 which are then subjected to a high degree of rotational acceleration. Since inertial plate 16 tries to remain at rest due to inertia during this acceleration, a differential motion will arise between inertial plate 16 and rotor 24. Hence, pawl 22 is caused to move in a radial direction as determined by supporting guide 19 which in turn if formed by projection 17 and 18. Pawl 22 is further caused to move in a radial direction in part by eccentric pin 29 and the peripheral surface of boss 25 of rotor plate 24 which is executing a relatively faster rotational rate than pawl 22. Accordingly, engaging face 23 is displaced as shown in FIG. 4 and engages one of ratchet teeth 11 of ratchet ring 10. This causes ratchet ring 10 to rotate against the tension of spring 8. Thus, male link 15 attached to pawl 7 is displaced from the position shown in FIG. 3 to the position shown in FIG. 4 by virtue of its engagement by female link 14 on slip ring 13. As a consequence, pawl 7 engages the ratchet teeth of discs 6 as shown in broken line in FIG. 4. When pawl 7 engages discs 6, retractor shaft 3 locks and further rotation in the direction of belt extension is prevented. If therefore becomes impossible to further extend seatbelt 4 and the body of the belt user is thus prevented from moving forward out of the seat. The mechanism remains locked until the force is reduced below a predetermined safe level.

As is clear by the above description, the present invention possesses an extremely simple construction in which pawl 22 is installed on one side of an inertial plate 16 so that the pawl may rotate and be displaced in a radial direction determined by supporting guide 19. This construction links pawl 22 within an eccentric pin 29 on a rotor plate 24 which, during normal conditions, rotates at the same rotational rate as inertial plate 16. Accordingly, the present invention may be easily assembled by mass production means by successively mounting inertial plate 16, then pawl 22 and then rotor plate 24 on retractor shaft 3. Furthermore, the means of generation of the differential motion between inertial plate 16 and rotor plate 24 and the rotation of eccentric pin 29 is smoothly converted into the linear motion of pawl 22 so that an emergency locking motion can be generated. Thus, the present invention is particularly characterized by the fast response times in which the belt may be locked within the retractor mechanism.

Although the present invention has been described with respect to the specific embodiment shown in FIGS. 1-5, it must clearly be understood that the embodiment illustrated is shown only for the purposes of invention and many other embodiments may incorporate the inventive concept of the present invention.

I claim:

1. A seatbelt retractor mechanism comprising:
   a frame;
   a retractor shaft rotatably coupled to said frame for winding a seatbelt thereon;
   a ratchet ring having internal ratchet teeth rotatably disposed on said retractor shaft;
   an inertial plate rotatably disposed on said retractor shaft;
   a rotor plate disposed on said retractor shaft and having an eccentric portion;
   spring means for coupling said rotor plate and inertial plate in a fixed relative configuration except when an inpulsive force is applied to said retractor shaft; and
   a pawl pivotally coupled to said eccentric portion of said rotor plate and slideably disposed on said inertial plate in a substantially radial direction of movement, such that when said rotor plate and inertial plate are rotatively displaced with respect to each other, said pawl moves pivotally and radially relative to said rotor plate and engages said ratchet ring and locking means responsive to rotation of said ratchet ring for locking said shaft in a belt withdrawal direction.

2. The mechanism of claim 1 wherein said locking means includes a first link coupled to the periphery of said ratchet ring, said first link engaging a second link, a second pawl mounted on said frame, said second link coupled to said second pawl, and a locking disc rigidly coupled to said shaft, said ratchet ring causing said first link to displace said second link into a position wherein said second pawl locks the position of said locking disc thereby preventing belt withdrawal.

3. The mechanism of claim 1 wherein:
   said inertial plate is substantially circumscribed said ratchet ring.

4. The mechanism of claim 3 further including a retracting spring means for urging said seatbelt into a coiled position.

5. The mechanism of claim 1 wherein said inertial plate has a plurality of balanced projections about the center of said inertial plate forming in part a support guide for said pawl, said support guide also including a boss coupled to said retractor shaft, said boss in slideable contact with said pawl plate.

6. The mechanism of claim 1 wherein said pawl is coupled to said eccentric portion about a point substantially located at the center of gravity of said pawl.

* * * * *